(12) United States Patent
Oravetz et al.

(10) Patent No.: US 9,027,522 B2
(45) Date of Patent: May 12, 2015

(54) CAMSHAFT WITH INTERNAL OIL FILTER (71) Applicant: Ford Global Technologies, LLC, Dearborn, MI (US)

(72) Inventors: Peter Michael Oravetz, Pleasant Ridge, MI (US); Ed Waszczenko, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 13/654,184

(22) Filed: Oct. 17, 2012

(65) Prior Publication Data

US 2014/0102394 A1    Apr. 17, 2014

(51) Int. Cl.
*F01M 1/06*   (2006.01)
*F01L 1/047*  (2006.01)
*F01M 1/10*   (2006.01)
*F01L 1/344*  (2006.01)

(52) U.S. Cl.
CPC .......... *F01M 1/06* (2013.01); *F01L 2001/0476* (2013.01); *F01M 2001/064* (2013.01); *F01M 2001/1035* (2013.01); *B01D 2201/295* (2013.01); *F01L 2001/0475* (2013.01); *F01L 2001/3444* (2013.01); *F01L 2810/02* (2013.01)

(58) Field of Classification Search
CPC .......... F01M 1/10; F01M 9/102; F01M 11/02; F01M 2001/10; F01M 1/06; F01M 2001/064; F01M 2001/1035; F01L 2001/0475; F01L 2001/0476; F01L 2810/02

USPC .............................. 123/90.34, 90.6; 29/888.1
See application file for complete search history.

(56) References Cited

U.S. PATENT DOCUMENTS

| | | | |
|---|---|---|---|
| 4,237,847 A | 12/1980 | Baugh et al. | |
| 5,937,812 A * | 8/1999 | Reedy et al. | 123/90.34 |
| 6,035,817 A | 3/2000 | Uchida | |
| 6,289,861 B1 | 9/2001 | Suzuki | |
| 6,343,580 B2 | 2/2002 | Uchida | |
| 6,378,483 B1 | 4/2002 | Kato | |
| 6,460,504 B1 * | 10/2002 | Phillips et al. | 123/196 R |
| 6,871,620 B2 | 3/2005 | Aimone | |
| 7,237,518 B2 * | 7/2007 | Oh | 123/90.33 |
| 7,610,890 B2 * | 11/2009 | Lettmann et al. | 123/90.6 |
| 8,051,820 B2 | 11/2011 | Shoji | |
| 2006/0021826 A1 | 2/2006 | Heintzen et al. | |

FOREIGN PATENT DOCUMENTS

| | | | |
|---|---|---|---|
| DE | 3447912 A1 | | 7/1985 |
| WO | WO 2006081788 A1 * | | 8/2006 |
| WO | WO 2007116294 A2 * | | 10/2007 |

* cited by examiner

*Primary Examiner* — Ching Chang
(74) *Attorney, Agent, or Firm* — Greg Brown; Alleman Hall McCoy Russell & Tuttle LLP (57) ABSTRACT

Embodiments in accordance with the present disclosure may provide a camshaft having a central oil passage and a radial passage to supply oil from the central passage to a bearing surface. The camshaft may include a filter disposed within the central passage which may allow oil to pass through the radial passage to the bearing surface, and which may prevent particles larger than a predetermined size to pass to the bearing surface.

20 Claims, 5 Drawing Sheets

CAMSHAFT WITH INTERNAL OIL FILTER

FIELD

The present application relates generally to bearing lubrication, and methods and systems for lubricating rotating member bearings. In some embodiments, the application relates to a camshaft with an internal oil filter, and to a filter configured to be disposed within a camshaft central bore.

BACKGROUND AND SUMMARY

Rotating or sliding surfaces between moving parts of an engine are typically lubricated, with a lubricant such as motor oil. Lubrication systems may include an oil pump configured to circulate oil from an oil pan, or oil sump, and into a number of oil passages, or galleries to various locations in the engine to lubricate bearings supporting the camshaft(s), the crankshaft, connecting rods, and the like. Some rotating members, such as camshafts include an axial passage configured to receive oil, and a radial passage at one or more bearings to pass the oil to the rotating bearing surface. The oil may return to the oil pan for recirculation after splashing around the engine, and/or running down various parts of the engines.

Debris that may be in the oil, and/or that may accumulate from surface wear can grind against moving parts, causing additional wear. Therefore, in an attempt to remove potentially harmful particles the oil is first passed through an oil filter before being directed to the oil galleries, or to other parts of the engine. However, it has been recognized that despite filtering the oil before being passed to the galleries, and/or other parts, some particles can get into undesirable locations such as bearing surfaces.

It has been proposed to include additional filters in the lubrication system. For example, U.S. Pat. No. 6,343,580 discloses locating an additional replaceable filter element in an enlarged bore formed at an upper end of an oil gallery formed in the cylinder head which cooperates with a corresponding main oil gallery formed in the associated cylinder block. The gallery in the cylinder head is intersected by a pair of supply passages, which communicate with drillings formed in the intake and exhaust camshafts. The drillings intersect radial drillings formed in the bearings to supply oil to the bearing surfaces.

However, the inventors herein have recognized some problems with this approach, for example, the filter disclosed in the '580 patent is located substantially far upstream from the camshaft bearings, in particular from the bearing furthest from the supply passages in communication with the drillings in the camshafts. The inventors have identified engine failures due to camshaft seizure of the number one bearing journal which may be located at the end of a camshaft furthest from an oil entry point. Debris entrained in the oil may enter the journal bearing interface and may cause the camshaft to seize. What is needed is a more effective way to prevent debris from entering the journal bearing interface.

Embodiments in accordance with the present disclosure may provide a camshaft having a central oil passage and a radial passage to supply oil from the central passage to a bearing surface. The camshaft may include a filter disposed within the central passage which may allow oil to pass through the radial passage to the bearing surface, and which may prevent particles larger than a predetermined size to pass to the bearing surface. In this way by placing an oil filter internally in the camshaft, any debris passing down the center of the camshaft may be filtered out, resulting in a continuous supply of clean oil to the journal bearings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
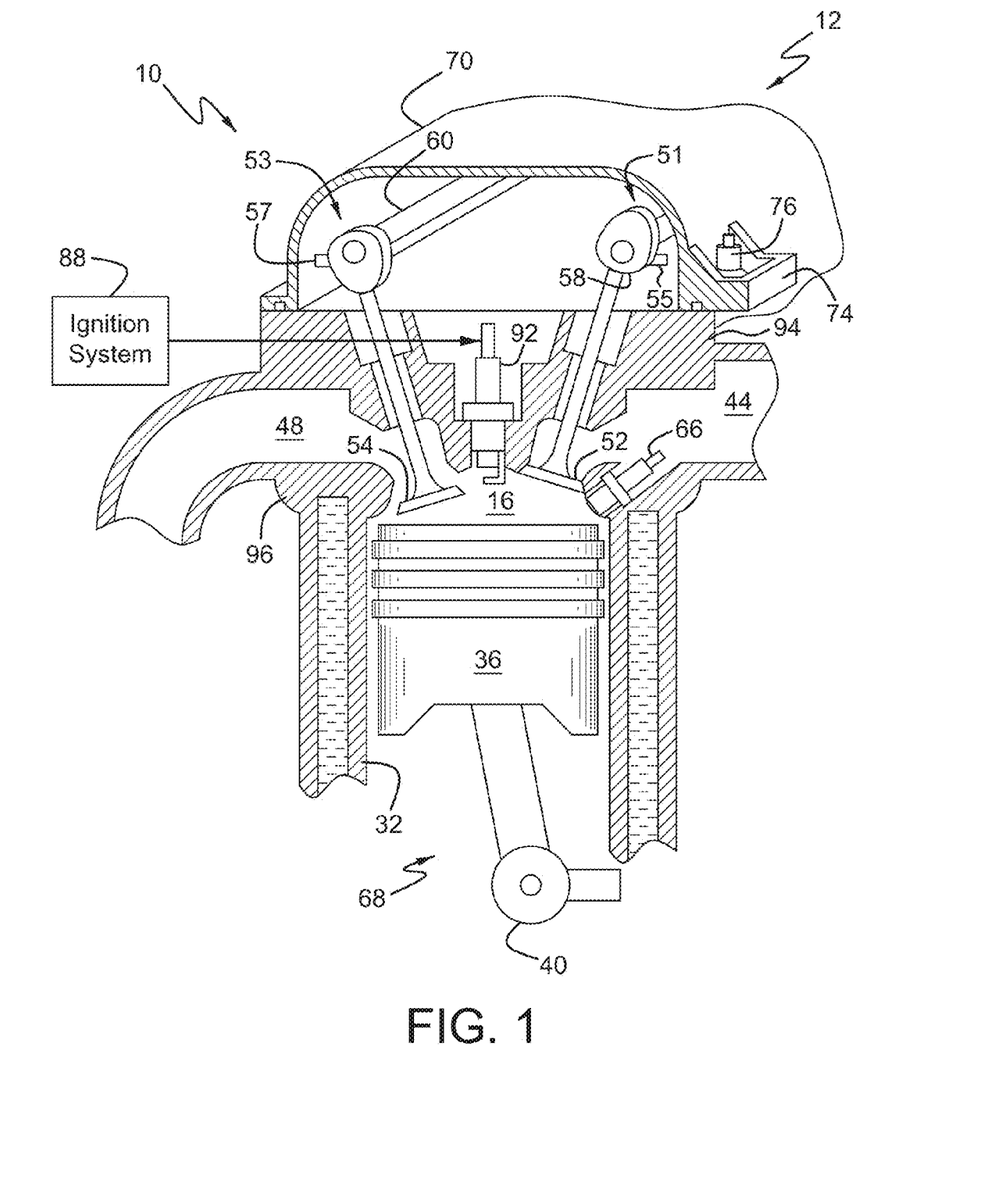
FIG. 1 is a partial cross sectional view, partial perspective view, illustrating a portion of an engine system of an internal combustion engine in accordance with the present disclosure.

FIG. 1 is a partial cross sectional view partial perspective view illustrating a portion of a system 10 for an internal combustion engine 12 in accordance with the present disclosure. One cylinder or one combustion chamber 16 of a multi-cylinder engine 12 is illustrated. Engine 12 may be controlled at least partially by a control system that may include a controller (not shown), and by input from a vehicle operator via an input device such as an accelerator pedal. Combustion chamber 16 of the engine 12 may include combustion chamber walls 32 with piston 36 positioned therein. Piston 36 may be coupled to crankshaft 40 so that reciprocating motion of the piston 36 is translated into rotational motion of the crankshaft 40. Crankshaft 40 may be coupled to at least one drive wheel of a vehicle via an intermediate transmission system. Further, a starter motor may be coupled to crankshaft 40 via a flywheel to enable a starting operation of engine 12.

Combustion chamber 16 may receive intake air from an intake manifold 44, and may exhaust combustion gases via exhaust passage 48. Intake manifold 44 and exhaust passage 48 may selectively communicate with combustion chamber 16 via respective intake valve 52 and exhaust valve 54. In some embodiments, combustion chamber 16 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams 58 and may utilize one or more of cam profile switching (CPS), variable cam timing (VCT), variable valve timing (VVT) and/or variable valve lift (VVL) systems that may be operated by the controller to vary valve operation. The cams 58 may be configured to rotate on respective revolving camshafts 60. As depicted, the camshafts 60 may be in a double overhead camshaft (DOHC) configuration, although alternate configurations may also be possible. The position of intake valve 52 and exhaust valve 54 may be determined by position sensors 55 and 57, respectively. The cams 58 may be configured for rotation on respective camshafts 60.

Fuel injector 66 is shown in an example configuration coupled directly to combustion chamber 16 for injecting fuel directly therein in proportion to a pulse width of a signal that may be received from the controller. In this manner, fuel injector 66 provides what is known as direct injection of fuel into combustion chamber 16. The fuel injector 66 may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 16 may alternatively or additionally include a fuel injector arranged in an intake passage of the intake manifold 44 in a configuration that provides what is known as port injection of fuel into the intake port upstream of combustion chamber 16.

Ignition system 88 may provide an ignition spark to combustion chamber 16 via spark plug 92 in response to a spark advance signal from the controller, under select operating modes. Though spark ignition components are shown, in some embodiments, combustion chamber 16 or one or more other combustion chambers of engine 12 may be operated in a compression ignition mode, with or without an ignition spark.

Cylinder head 94 may be coupled to a cylinder block 96. The cylinder head 94 may be configured to operatively house, and/or support, the intake valve(s) 52, the exhaust valve(s) 54, the associated valve actuation systems 51 and 53, and the like. Cylinder head 94 may also support camshafts 60. Other components, such as spark plug 92 may also be housed and/or supported by the cylinder head 94. The cylinder block 96 may be configured to house the piston 36. In one example, cylinder head 94 may correspond to a cylinder located at a first end of the engine.

The engine 12 may also include a cam cover 70 configured to substantially provide a covering surface, for example covering the cam and separating it from external contaminants. Cam cover 70 may also include a perimeter flange 74 that may be juxtaposed on cylinder head 94. The cam cover 70 may be mounted and sealed on cylinder head with a plurality of bolts 76 interspersed along the perimeter flange 74 of the cam cover 70.

As described above, FIG. 1 merely shows one cylinder of a multi-cylinder engine. It will be understood that each cylinder may have its own set of intake/exhaust valves, fuel injectors, spark plugs, and cams, etc. The camshafts 60 may be journaled for rotation and to actuate multiple valves, or sets of valves to affect intake and exhaust for the respective multiple cylinders.

Figure 2:
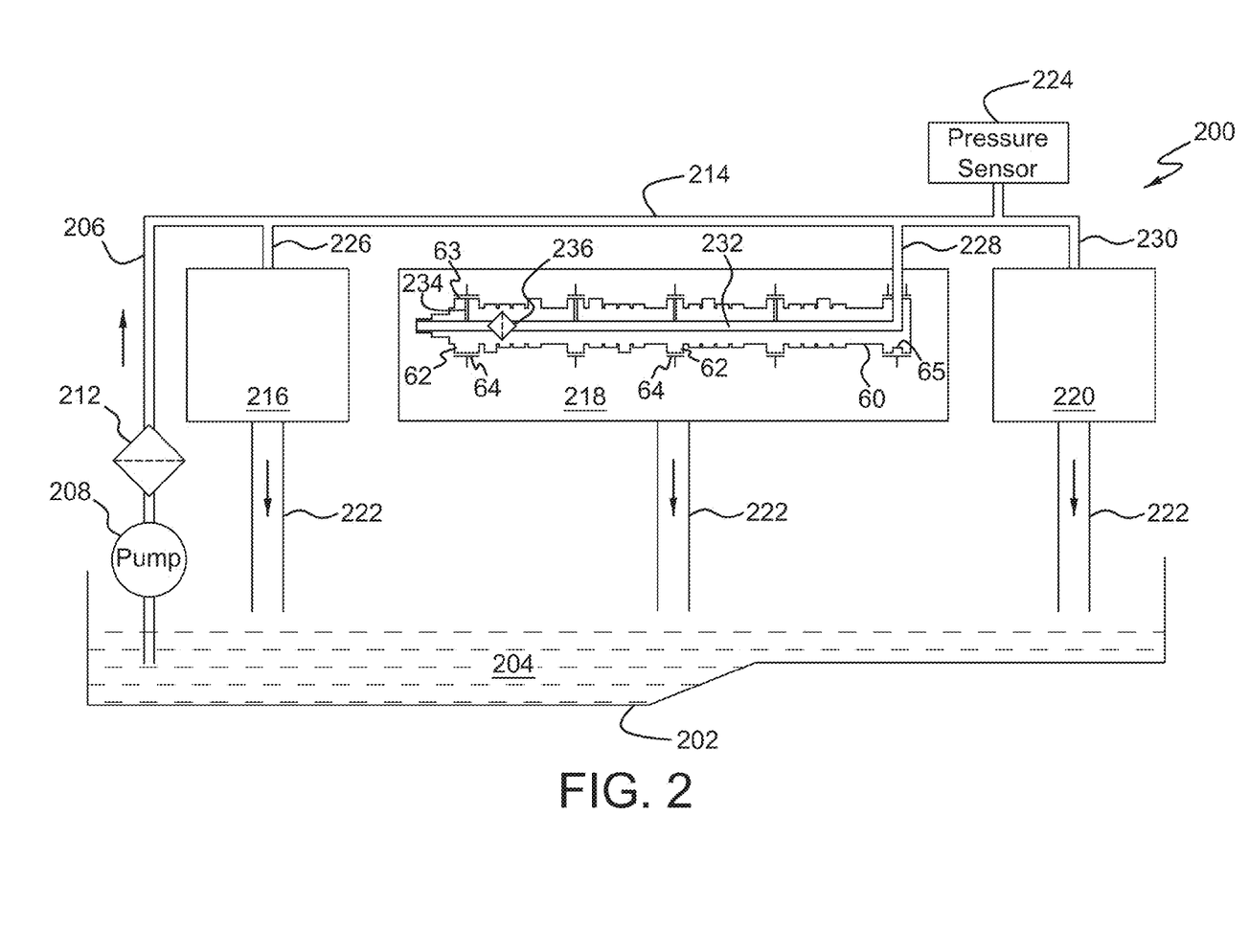
FIG. 2 is system view illustrating an example lubrication system and three example lubrication subsystems in accordance with the present disclosure wherein one example subsystem may include a rotating member such as a camshaft.

FIG. 2 shows an example embodiment of an engine lubrication system 200, for example an oil lubrication system, with an oil pump 208 which may be coupled to crankshaft 40 (FIG. 1) or actuated via other ways. The lubrication system 200 may include various oil subsystems 216, 218, 220. The oil subsystems 216, 218, 220 which may utilize oil flow to perform some function, such as lubrication, actuation of an actuator, etc. For example, one or more of the oil subsystems 216, 218, 220 may be hydraulic systems with hydraulic actuators and hydraulic control valves. Further, the oil subsystems 216, 218, 220 may be lubrication systems, such as passageways for delivering oil to moving components, such as the camshafts, cylinder valves, etc. Still further non-limiting examples of oil subsystems are camshaft phasers, cylinder walls, miscellaneous bearings, etc.

Oil may be supplied to the oil subsystems 216, 218, 220 through a supply channel 206 and oil may be returned through a return channel 222 and/or via a path wherein the oil may simply run or drip back to an oil reservoir 204. In some embodiments, there may be fewer or more oil subsystems.

The oil pump 208 may be configured to suck oil from oil reservoir 204, stored in oil pan 202, through supply channel 206. Oil may be delivered from oil pump 208 with pressure through supply channel 206 and oil filter 212 to main galley 214. The pressure within the main galley 214 may be a function of the force produced by oil pump 208 and the flow of oil entering each oil subsystem 216, 218, 220 through respective subsystem supply channels, or galleries, 226, 228, 230. Oil may return to oil reservoir 204 at, for example, atmospheric pressure through return channel 222. Oil pressure sensor 224 measures main galley oil pressure and sends the pressure data to the controller (not shown).

Subsystem 218 illustrates an example embodiment in accordance with the present disclosure wherein lubrication, for example oil, may be supplied to a camshaft 60. The camshaft 60 may be supported by bearings 62 housed for rotation inside corresponding bushings 64. The camshaft 60 that may include a central passage 232 and an outlet passage 234, which may be a radial passage, to supply oil from the central passage 232 to a bearing surface 63. The camshaft 60 may include a filter 236 disposed within the central passage 232 to allow oil to pass through the outlet passage 234 to the bearing surface 63 and to prevent particles larger than a predetermined size to pass to the bearing surface 63.

The bearing surface 63 may be on a number one bearing 62 of the camshaft 60. The camshaft 60 may include includes more bearings 62, for example four other bearings 62 located upstream from the filter 236. The number one bearing 62 may be considered to be the bearing on the end of camshaft typically coupled with the engine timing belt. The number five bearing may be the bearing on the opposite end, and may be at the end where oil or other lubricant is supplied to the central passage. Number two three and four bearings may be the bearings located between the number one and the number five bearings. The number five bearing may include a circumferential groove 65 configured to receive the oil to pass into the central passage 232. Other configurations may be used. In some embodiments the filter 236 may be located upstream from two or more of the bearings.

Figure 3:
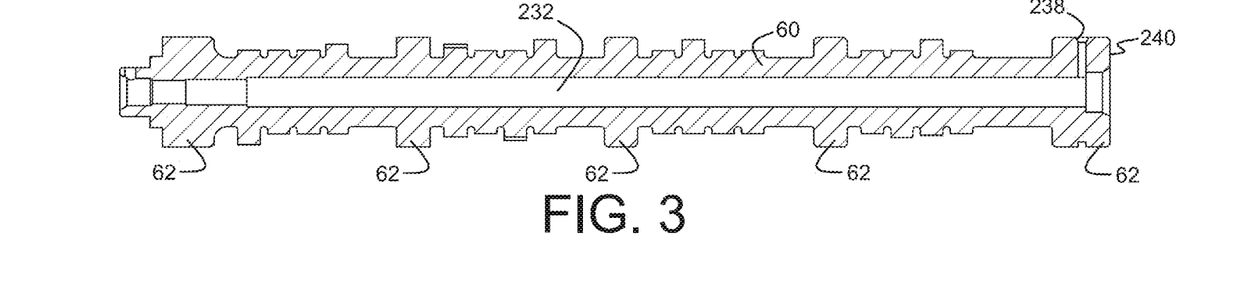
FIG. 3 is a sectional view of a sample camshaft that may have a filter disposed within a central bore therein.
Figure 4:
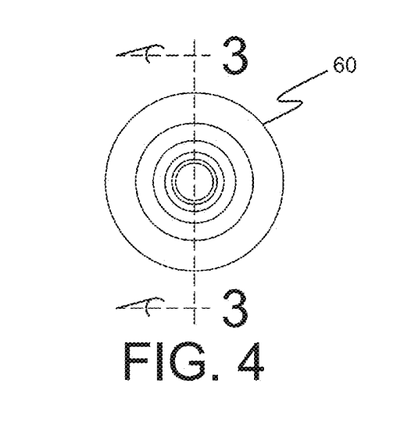
FIG. 4 is an end view of the camshaft illustrated in FIG. 3.
Figure 5:
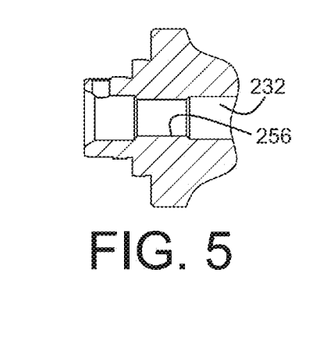
FIG. 5 is a blown up view of a portion of the camshaft illustrated in FIG. 3.

FIG. 3 is a sectional view of an example camshaft 60 having a central passage 232 configured to receive a lubricant at an inlet 238 at a first end 240 thereof. The inlet may be coupled with a channel, or gallery, 228 (FIG. 2). The camshaft 60 may be supported at, for example, five bearings 62. FIG. 4 is an end view of the camshaft 60 illustrated in FIG. 3. FIG. 5 is a blown up view of a portion of the camshaft 60 illustrated in FIG. 3 illustrating some example inner contours of the central passage 232.

Figure 6:
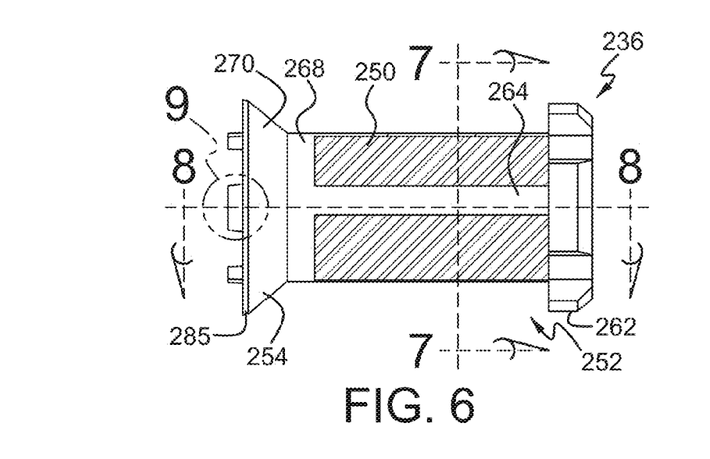
FIG. 6 is a side view of an example filter that may be configured to be disposed within the example camshaft shown in FIGS. 3-5.
Figure 7:
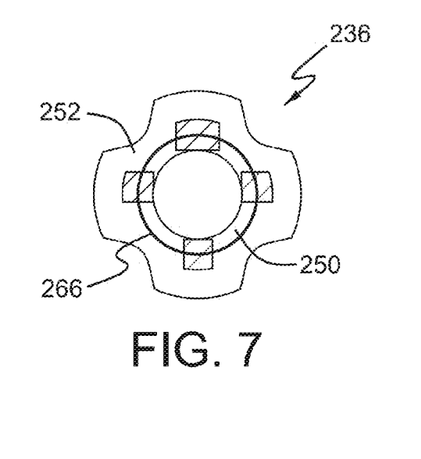
FIG. 7 is a sectional view of the filter illustrated in FIG. 6 taken at the line A-A therein.
Figure 8:
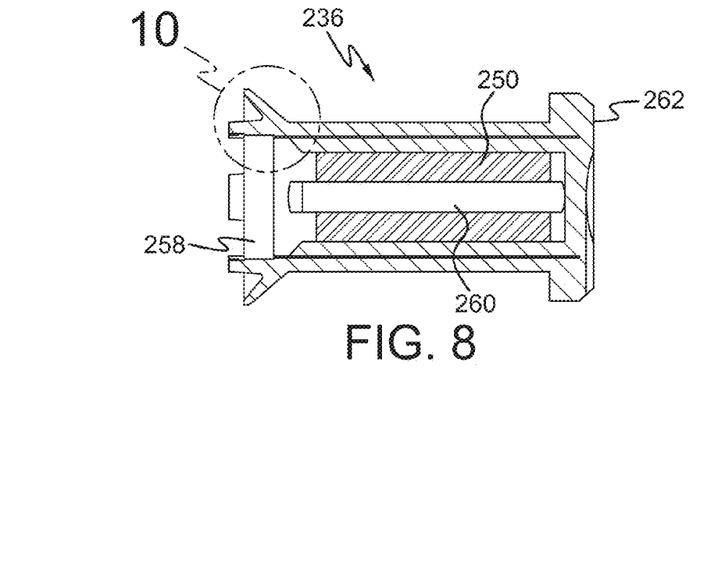
FIG. 8 is a sectional view of the filter illustrated in FIG. 6 taken at the line B-B therein.
Figure 9:
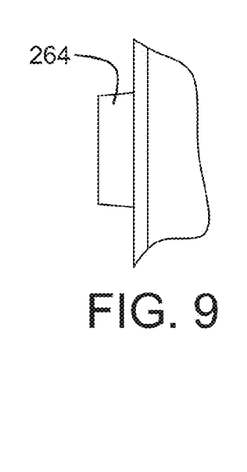
FIG. 9 is a scaled up view of a portion of the filter illustrated in FIG. 6 in circle A therein.
Figure 10:
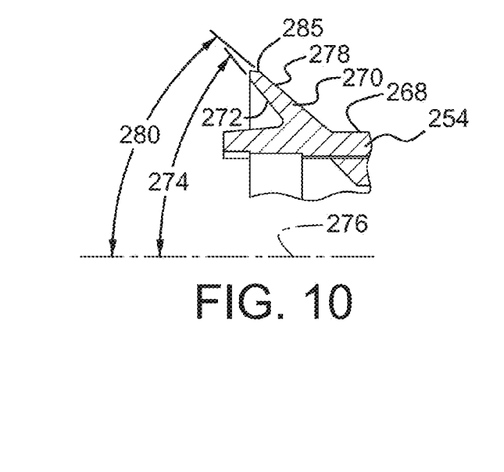
FIG. 10 is a scaled-up view of a portion of the filter illustrated in FIG. 7 in circle B therein.
Figure 11:
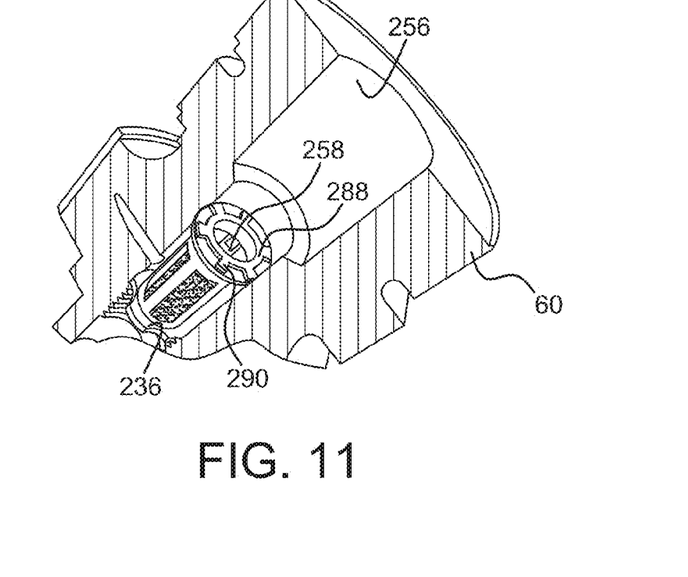
FIG. 11 is a perspective cutaway view of a portion of an example camshaft with a filter disposed therein in accordance with the present disclosure.

FIG. 6 is a side view of an example filter 236 that may be configured to be disposed within the example camshaft 60 shown in FIGS. 3-5, and as illustrated schematically in FIG. 2. FIG. 7 is a sectional view of the filter 236 illustrated in FIG. 6 taken at the line A-A. FIG. 8 is a sectional view of the filter 236 illustrated in FIG. 6 taken at the line B-B. FIG. 9 is a scaled up view of a portion of the filter 236 illustrated in FIG. 6 in circle A. FIG. 10 is a scaled up view of a portion of the filter 236 illustrated in FIG. 8 in circle B. FIG. 11 is a perspective cutaway view of a portion of an example camshaft 60 with a filter 236 disposed therein in accordance with the present disclosure.

The filter 236 may include a substantially tubular filtering membrane 250 coupled with a frame body 252, for example the membrane may be in the shape of a tube within manufacturing tolerances. The frame body 252 may include an upstream frame member 254 configured for sealing engagement with an inside surface 256 (FIG. 5) of the central passage 232 and having a hole 258 (FIG. 8) therein configured to allow the oil to pass therethough and to an inside 260 of the tubular filtering membrane 250. The frame body 252 may also include a downstream frame member 262 coupled with the upstream frame member 254 with two or more spaced apart elongate members 264. The downstream frame member 262 may be configured to seal an end of the substantially tubular filtering membrane 250 to direct the oil through the tubular filtering membrane 250.

The elongate members 264 may be configured to at least partially abut a circumferential surface 266 of the tubular filtering membrane 250. With some example embodiments the two or more spaced apart elongate members 264 may be four circumferentially spaced elongate members 264.

The upstream frame member 254 may include a torroidal ring 268 and a frusto-conical ring 270 coupled to an upstream side of the torroidal ring 268, the frusto-conical ring 270 being at least partially deformable in a radial direction. The frusto-conical ring 270 may be configured to provide the sealing engagement with the inside surface 256 of the central passage 232. The frusto-conical ring 270 may have an inside surface 272 making a first angle 274 with a central axis 276 of the filter, and an outside surface 278 making a second angle 280 with the central axis 276 of the filter 236. The first angle 274 may be greater than the second angle 280.

Figure 12:
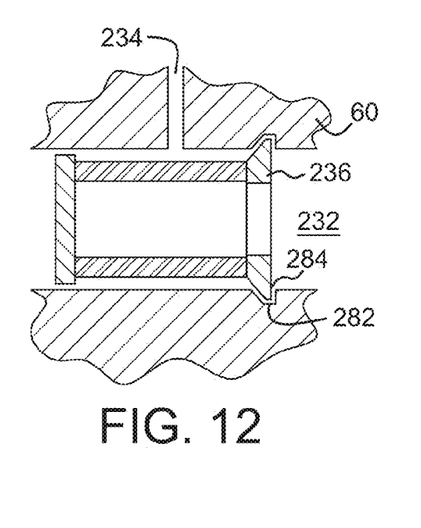
FIG. 12 is a partial cross-sectional view of another example filter located in an example camshaft in accordance with the present disclosure

FIG. 12 is a partial cross-sectional view of another example filter 236 located in an example camshaft 60, in accordance with the current disclosure. The camshaft 60 may include an internal groove 282 formed into the central passage 232. The filter 236 may include a protrusion 284 configured to fit into the internal groove 282 to hold the filter 236 in place in the central passage 232. The internal groove 282 may be formed into the camshaft 60 when the camshaft is manufactured, or may be cut into the camshaft 60, at a later time. The internal groove 282 may be a machined internal groove 282.

Figure 13:
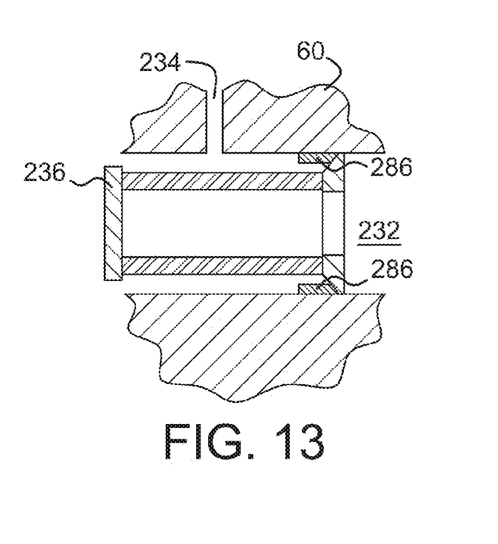
FIG. 13 is a partial cross-sectional view of another example filter located in an example camshaft in accordance with the present disclosure.

FIG. 13 is a partial cross-sectional view of another example filter 236 located in an example camshaft 60, in accordance with the current disclosure. The retention device 286 may be configured to be secured within the central passage 232. The retention device 286 may be configured to hold the filter 236 in place in the central passage 232. The retention device 286 may be for example in the form of a ring, or the like that may be added to the camshaft 60, or may be included in the camshaft 60 when the camshaft 60 is manufactured. Other retention device configurations may be used.

Another example embodiment may include a camshaft 60 having an elongate body. A central passage 232 or central bore may be located in the elongate body. An entry port, or inlet 238, may be configured to pass a lubricant into the central passage 232. A bearing surface 63 may be configured to at least partially support the camshaft 60 for rotation. At least one outlet passage 234 may be configured to pass the lubricant from the central passage 232 to the bearing surface 63. A filter 236 may be disposed within the central passage 232 between the entry port, or inlet 238, and the outlet passage 234, and may be configured to allow at least some of the lubricant to pass from the central passage 232 to the bearing surface 63, but to prevent particles in the lubricant bigger than a predetermined size from passing to the bearing surface 63.

The filter 236 may include a filtering membrane 250. The filter 236 may also include an upstream frame member 254 coupled to a downstream frame member 262, which may be formed as an end plate, with two or more elongate members 264 forming a frame body 252, which may be in the form of a substantially cylindrical armature configured to support the filtering membrane 250. For example, the armature may be cylindrical within manufacturing tolerances.

The upstream frame member 254 may include a circumferential edge 285 (FIGS. 6 & 9) configured for sealing engagement with an inside surface 256 of the central passage 232. The upstream frame member 254 may also include a hole 258 configured for the oil to pass to an inside 260 of the substantially cylindrical armature (frame body 252) and through the filtering membrane 250 to an outside of the substantially cylindrical armature.

The frame body 252 may include annulus piece 288 coupled with the upstream frame member 254 (FIG. 11). The frame body 252 may be made from a first material, and the annulus piece 288 may be made from a second material. In this way the frame body 252 may include one or more qualities otherwise not included with a single material example. For example the frame body 252 may have resilient properties with a two or more material embodiment that may aid in installation, or adherence to the inside of the camshaft 60. The annulus piece 288 may also include a number of radially extending arms 290, for example six radially extending arms 290.

Another example embodiment may provide a lubrication system for a rotatable member. The rotatable member may be, for example a camshaft 60. The rotatable member may include an elongate body, and a central passage 232 in the elongate body. Two or more bearing surfaces 63 may be configured to support the elongate body for rotation. An opening, or inlet 238, in the central passage 232 may be configured to receive a pressurized oil. An oil passage, for example an outlet passage 234, may be configured to pass oil from the central passage 232 to the bearing surface 63 to lubricate at least one of the two or more bearing surfaces 63. A filter 236 may be disposed within the central passage 232 between the inlet 238 and the outlet passage 234, or oil passage, to allow an oil to pass therethrough, and to prevent particles larger than a predetermined size from passing therethrough to at least one of the two or more bearing surfaces 63.

The rotatable member may be configured to open and close a plurality of valves to regulate passage of intake air into, and exhaust gas out of, a plurality of combustion chambers. As stated, the rotatable member may be a camshaft 60. In other examples the elongate body may be a shaft to transmit force, or motion. In one example the elongate body may be a may be a crankshaft.

It should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A camshaft comprising:
   a central oil passage supplied with oil at a second end opposite a first end;
   a plurality of bearings including a first bearing positioned at the first end;
   a plurality of radial passages each to supply oil from the central passage to a respective bearing; and
   a filter disposed within the central passage upstream of the first bearing, only the first bearing receiving oil that passes through the filter.

2. The camshaft of claim 1, wherein the filter includes a substantially tubular filtering membrane coupled with a frame body, the frame body including:
   an upstream frame member configured for sealing engagement with an inside surface of the central passage and having a hole therein configured to allow the oil to pass therethrough and to an inside of the tubular filtering membrane, and
   a downstream frame member coupled with the upstream frame member with two or more spaced apart elongate members, the downstream frame member sealing an end of the substantially tubular filtering membrane to direct the oil through the tubular filtering membrane.

3. The camshaft of claim 2, wherein the two or more spaced apart elongate members are configured to at least partially abut a circumferential surface of the tubular filtering membrane.

4. The camshaft of claim 2, wherein the two or more spaced apart elongate members are four circumferentially spaced elongate members.

5. The camshaft of claim 2, wherein the upstream frame member includes a torroidal ring and a frusto-conical ring coupled to an upstream side of the torroidal ring, the frusto-conical ring being at least partially deformable in a radial direction.

6. The camshaft of claim 2, wherein the upstream frame member includes a frusto-conical ring configured to provide the sealing engagement with the inside surface of the central passage, the frusto-conical ring having an inside surface making a first angle with a central axis of the filter and an outside surface making a second angle with the central axis of the filter wherein the first angle is greater than the second angle.

7. The camshaft of claim 1, wherein the filter includes a filtering membrane arranged in a tube having an open upstream end and a closed downstream end, the tube configured to allow the oil to pass into the upstream end and through the filtering membrane.

8. The camshaft of claim 1, further comprising an internal groove formed into the central passage, and wherein the filter includes a protrusion configured to fit into the internal groove to hold the filter in place in the central passage.

9. The camshaft of claim 1, further comprising a retention device configured to be secured within the central passage and wherein the retention device is configured to hold the filter in place in the central passage.

10. The camshaft of claim 1, wherein the first end of the central passage is at an end of the camshaft configured to be coupled with an engine timing belt.

11. The camshaft of claim 1, wherein the plurality of bearings includes four other bearings located upstream from the filter and the first bearing, such that oil that does not pass through the filter is supplied to the four other bearings.

12. A camshaft comprising:
   an elongate body having a first end and a second end opposite the first end, the first end configured to couple with an engine timing belt;
   a central bore in the elongate body;
   an entry port at the second end configured to pass a lubricant into the central bore;
   a first bearing surface at the first end and at least two other bearing surfaces, each bearing surface configured to at least partially support the camshaft for rotation;
   a plurality of outlet passages each configured to pass the lubricant from the central bore to a respective bearing surface;
   a filter disposed within the central bore upstream of the outlet passage of the first bearing surface and downstream of each remaining outlet passage and configured to allow at least some of the lubricant to pass from the central bore to the first bearing surface, but to prevent particles in the lubricant bigger than a predetermined size to pass to the first bearing surface.

13. The camshaft of claim 12, wherein the filter includes a filtering membrane and an upstream frame member coupled to an end plate with two or more elongate members forming a substantially cylindrical armature configured to support the filtering membrane.

14. The camshaft of claim 13, wherein the upstream frame member includes a circumferential edge configured for sealing engagement with an inside surface of the central bore, and a hole configured for the oil to pass to an inside of the substantially cylindrical armature and through the filtering membrane to an outside of the substantially cylindrical armature.

15. The camshaft of claim 13, further comprising a downstream member coupled to the two or more elongate members and configured to close the substantially cylindrical armature at a downstream end such that the lubricant passes through the filtering membrane.

16. The camshaft of claim 13, wherein the frame member is made from a first material, and further comprising an annulus piece coupled with the upstream frame member made from a second material.

17. The camshaft of claim 16, wherein the annulus piece includes six radially extending arms.

18. A lubrication system for a rotatable member comprising:
   an elongate body;
   a central bore in the elongate body;
   three or more bearing surfaces configured to support the elongate body for rotation;
   an opening in the central bore configured to receive a pressurized oil;
   a plurality of oil passages each configured to pass oil from the central bore to a respective bearing surface to lubricate the three or more bearing surfaces; and
   a filter disposed within the central bore downstream of at least two of the plurality of oil passages and upstream of one of the plurality of oil passages to allow oil to pass therethrough and to prevent particles larger than a predetermined size from passing therethrough to one of the bearing surfaces.

19. The lubrication system of claim 18, wherein the elongate body is a camshaft.

20. The lubrication system of claim 18, wherein the three or more bearing surfaces include five bearing surfaces and four sets of cams interposed between the bearing surfaces, and wherein the filter is located downstream from four of the bearing surfaces and upstream from one of the three or more bearing surfaces.

* * * * *